United States Patent [19]

Johnston

[11] Patent Number: 4,694,691
[45] Date of Patent: Sep. 22, 1987

[54] AIR PRESSURE GAUGE TOOL

[75] Inventor: John G. Johnston, Oak View, Calif.

[73] Assignee: M. O. Enterprises, Inc., Walnut Grove, Calif.

[21] Appl. No.: 864,455

[22] Filed: May 19, 1986

[51] Int. Cl.⁴ .......................... B60C 23/02; G01L 7/00
[52] U.S. Cl. ...................................... 73/146.8; 73/714
[58] Field of Search .................... 73/146.8, 146.3, 714, 73/744, 756

[56] References Cited

U.S. PATENT DOCUMENTS 3,852,839 12/1974 Blessing .............................. 73/146.8
4,526,030 7/1985 Vecera, Jr. .......................... 73/146.8

Primary Examiner—Donald O. Woodiel
Attorney, Agent, or Firm—Jack C. Munro

[57] ABSTRACT

A tool which is designed primarily to be used by truckers, which takes the form of a housing, one end of which terminates in a graspable handle and the other end of which terminates in an operating head. Within the graspable handle there is located an air pressure gauge. Within the operating head, there is located a valve assembly. The valve assembly is to be connectable to a source of pressurized air which is to be conducted through an air passage assembly within the housing to an air pressure gauge. The air pressure operates an inflation valve of the air pressure gauge and visually displays a value corresponding to the amount of air pressure. The operating head includes a groove arrangement permitting mounting thereon of an accessory tool. The valve assembly is movable relative to the operating head.

4 Claims, 8 Drawing Figures

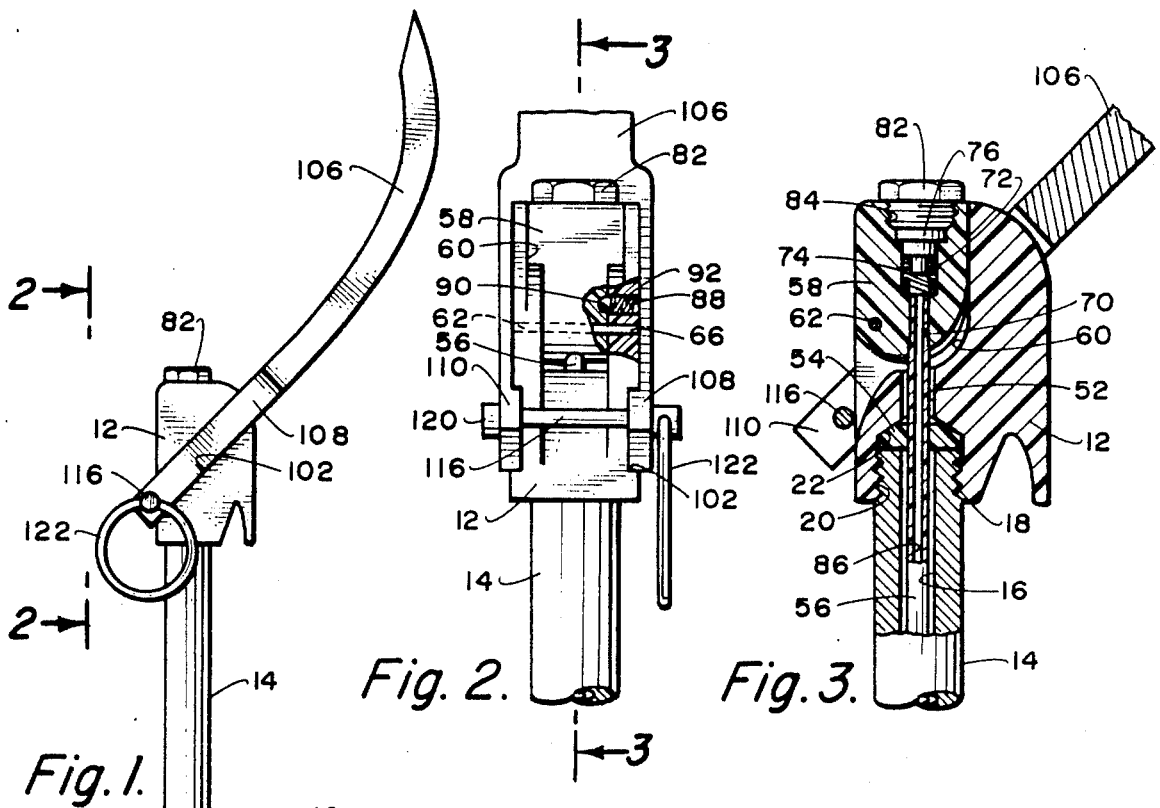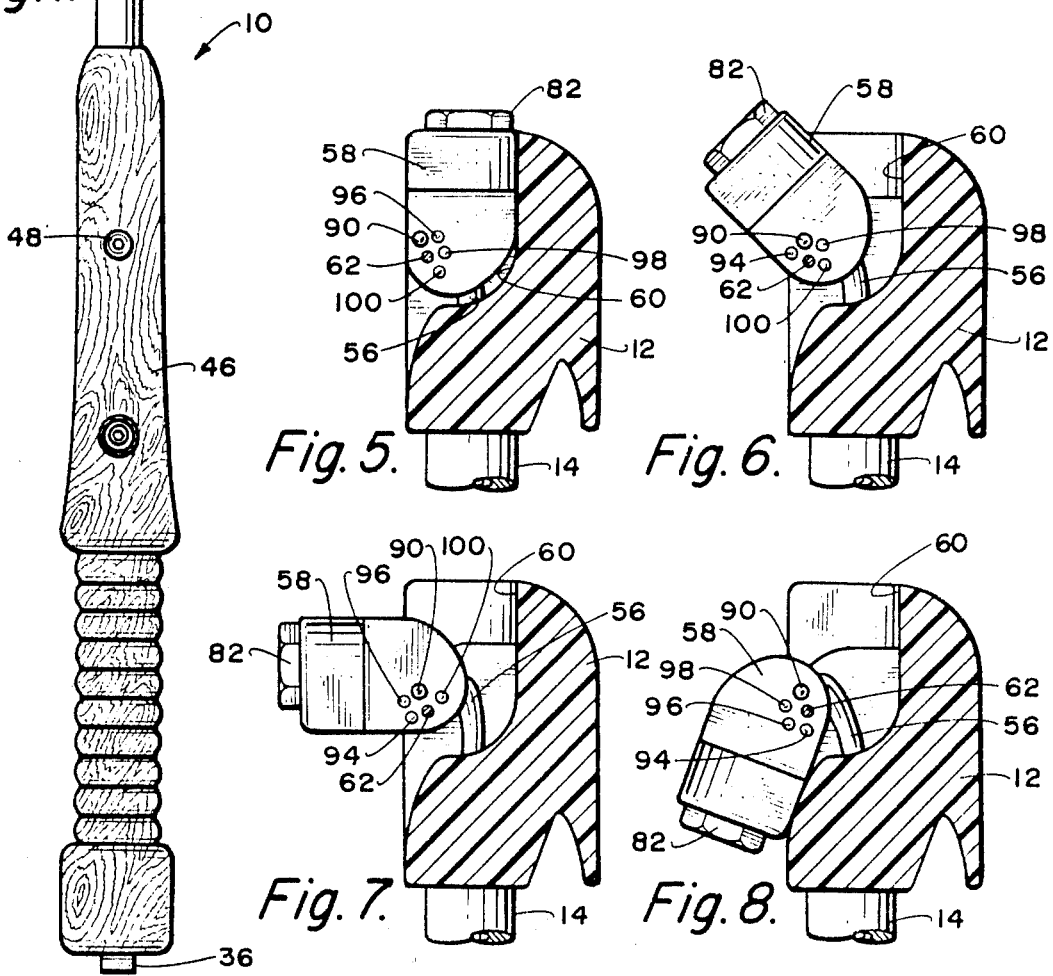

4,694,691

AIR PRESSURE GAUGE TOOL

BACKGROUND OF THE INVENTION

The field of this invention relates to tools and more particularly to a tool which is usable to ascertain air pressure within tires where it may be difficult to gain access to the tire air valve.

Large trucks have a substantial number of wheels, normally four, six or eight wheels on a single axle. Each wheel includes an inflatable tire which is inflated with air. Inflation of each tire is achieved through a single valve which extends through an opening formed within the metallic rim which supports the tire.

Because a single axle of a truck has a plurality of wheels, it is at times difficult to gain access to these valves in order to ascertain whether or not the tire is properly inflated. There is a need for a tool which facilitates access to these valves and could readily determine inflation of each tire.

Additionally, stones may become lodged within the tread of the tires. It is desirable to remove these stones because the stones can become damaging to the tire over a period of time. Still further, truckers have need for other types of tools, such as a shovel or a pick. One use for a shovel could be if the truck becomes stuck in loose or wet terrain with the shovel being used to free the truck.

SUMMARY OF THE INVENTION

The air pressure gauge tool of the present invention includes an elongated housing, the back end of which includes a graspable handle. Mounted within the graspable handle is an inflation gauge assembly. The fore end of the housing includes an operating head within which is incorporated a valve assembly. The operating head also has formed on its exterior surface a groove arrangement. This groove arrangement is to facilitate connection with any one of a plurality of different accessory tools, such as a shovel or pick. The valve assembly is connected through a flexible air passage conduit to the inflation gauge assembly. The valve assembly is movable relative to the operating head to be locatable in any one of a plurality of different positions. During the movement of this valve assembly, the flexible air passage conduit bends. With the valve assembly connected to a tire inflation valve, air pressure within the tire is conducted through an air passage conduit to operate the inflation valve assembly and thereby visually ascertain the air pressure within the tire. The operating head includes a detent mechanism for fixing of the valve assembly relative to the operating head in any one of the different positions.

The primary objective of the present invention is to construct a tool which is to be usable primarily by truckers which facilitates quick and easy determination if the tires of the truck are properly inflated.

A further objective of this invention is to construct a tool to be connectable to various accessories so that the tool can be used to accomplish other functions other than merely checking the inflation of a tire.

BRIEF DESCRIPTION OF THE DRAWINGS

FIG. 1 is a side elevational view of the air pressure gauge tool of the present invention showing the gauge tool connected to a pick type of accessory;

FIG. 2 is a back elevational view of a portion of the air pressure gauge tool of the present invention taken along line 2—2 of FIG. 1, which is partially cut away to show more clearly the detent mechanism which is incorporated within the operating head of the tool of the present invention;

FIG. 3 is a cross-sectional view taken along line 3—3 of FIG. 2;

FIG. 5 is a cross-sectional view through the operating head of the tool of the present invention showing the valve assembly in a first position relative to the operating head;

FIG. 6 is a view similar to FIG. 5, but showing the valve assembly in a second position relative to the operating head;

FIG. 7 is a view again similar to FIG. 5, but showing the valve assembly in a third position; and FIG. 8 is a view, again similar to FIG. 5, showing the valve assembly in a fourth position.

DETAILED DESCRIPTION OF THE SHOWN EMBODIMENT

Figure 4:
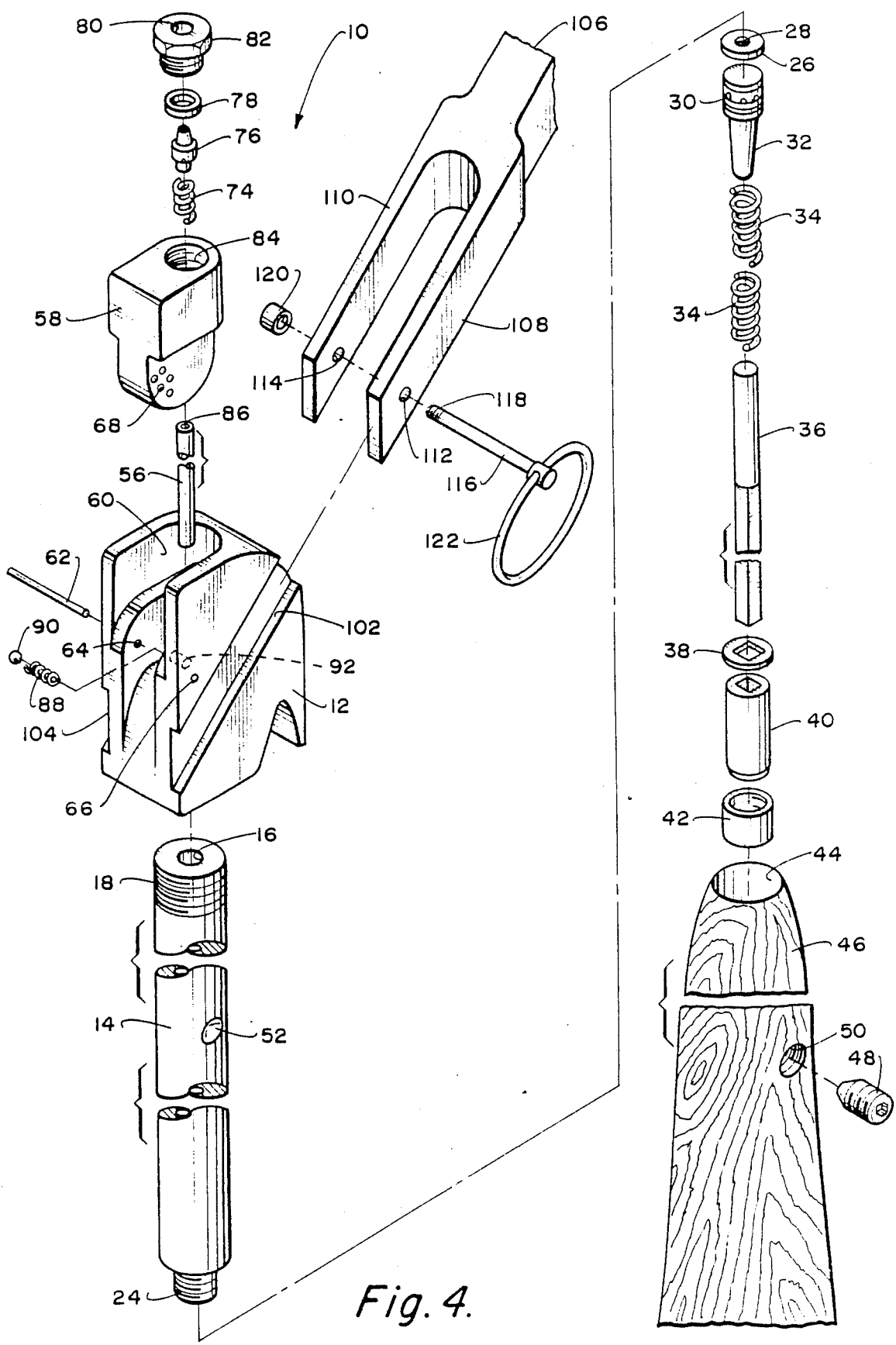
FIG. 4 is an exploded isometric view of the air pressure gauge tool of the present invention.

Referring particularly to the drawings, there is shown the tool 10 of the present invention which is composed generally of an operating head 12 located on the fore end of the tool 10. Threadably connected to the operating head 12 is a rigid housing 14 which has an internal chamber 16. The upper end of the housing 14 includes a series of external threads 18. The threads 18 threadably engage with an internal set of threads 20 formed within an opening 22 in the operating head 12. The lower end of the housing 14 also includes a smaller diametered threaded section 24 which will be explained further on in this specification.

Mounted within the internal chamber 16 is an inflation valve assembly. The inflation valve assembly includes a brass washer 26. This washer 26 has a centrally located orifice 28. The washer 26 is to be in continuous contact with a piston 30. The piston 30 includes a rearwardly located tapered section 32 which is to be located within a coil spring 34. The inner end of a read-out bar 36 is to be located within the coil spring 34 and in contact with the tapered section 32. The read-out bar 36 includes numerical readable indicia.

The outer end of the read-out bar 36 is conducted through guide washer 38 into a sleeve 40. There is a slight frictional force exerted between the sleeve 40 and the read-out bar 36 so as to prevent total freedom of movement therebetween. An end cap 42 is located about the outer end of the sleeve 40 and is to be threadably connected to threaded section 24.

It can thus be seen that the entire inflation valve assembly, composed of parts 26 through 40, is confined within the housing 14 with the exception of the protrusion of the outer end of the read-out bar 36. The housing 14 is to be located within the chamber 44 of a graspable handle 46. The position of the graspable handle 46 with respect to the housing 14 is fixed by means of a set screw 48. The set screw 48 is threadably connected through a hole 50 formed within the graspable handle 46. The inner end of the set screw 48 rests within a recess 52 formed within the housing 14.

Within the operating head 12 there is formed an open ended passage 52. One end of the passage 52 centrally connects with opening 22. A sealing washer 54 is located within the opening 22 and is designed to form an airtight seal between the operating head 12 and the housing 14. Located within the internal chamber 16 is a flexible walled conduit 56. This conduit 56 passes through the passage 52.

A valve housing 58 is mounted within a recess 60 formed within the operating head 12. The pin 62 is mounted within holes 64 and 66 of the operating head 12 and extends across the recess 60. As the pin 62 passes across the recess 60, it is conducted through holes 68 formed with the valve housing 58. The valve housing 58 is capable of pivoting about the pin 62 relative to the operating head 12.

Flexible walled conduit 56 is tightly mounted within a passage 70 of the valve housing 58. The passage 70 connects to larger diametered chamber 72 within which is located a spring 74. The coil spring 74 presses continuously against a valve pin 76. The valve pin 76 is mounted within a washer 78. The valve pin 76 is pressed into hole 80 formed within a plug 82. The plug 82 is threadably mounted within threaded opening 84 formed within the valve housing 58.

When a valve stem (not shown) of a conventional tire inflation valve is pressed against the valve pin 76. The valve pin 76 will move and compress spring 74. A small portion of the pressurized air within the tire will be conducted through the hole 80 and into the passage 86 formed within the flexible walled conduit 56. This pressurized air within the passage 86 is passed through the orifice 28 and presses gainst the piston 30. As a result, the piston 30 moves which in turn moves the read-out bar 36 relative to housing 14 causing such to extend exteriorly the graspable handle 46. The amount of extension of the read-out bar 36 is proportional to the value of the pressurized air located within the tire (not shown).

In order to facilitate connection of the valve housing 58 with the tire valve (not shown) even if the tire valve is located at a "difficult to get at" location, the operator can manually move the valve housing 58 to different positions to other than the straight-line position shown in FIG. 5. The operator is able to move the valve housing 58 to a forty-five degree displaced position as shown in Figure 6 or to a ninety degree displaced position shown in FIG. 7, or even the almost reversed one hundred eighty degree position shown in FIG. 8. When the valve housing 58 is so moved to these different positions, it is desirable that the valve housing 58 be held in these positions. In order to achieve that, there is located a detent arrangement in the form of a spring 88 and a ball 90 which are mounted within a compartment 92 formed with the operating head 12. The compartment 92 is open to the recess 60 with the ball 90 being pressed against a portion of the valve housing 58. Formed within the valve housing 58 are four in number of recesses 94, 96, 98 and 100. When the ball 90 is located within recess 94, the valve housing 58 assumes a straight-line position shown in FIG. 5. When the ball 90 is located within the recess 96, the valve housing 58 assumes the forty-five degree position.shown in FIG. 6. When the ball 90 is located within the recess 98, the valve housing 58 is located in the ninety degree position shown in FIG. 7. When the ball 90 is located within the recess 100, the valve housing 58 is located within the reversed position shown in FIG. 8.

The operating head 12 has formed on each side thereof a pair of grooves 102 and 104. An accessory tool, such as a pick 106, has a bifurcated inner end forming a pair of spaced-apart legs 108 and 110. The leg 108 is to connect with the groove 102 with the leg 110 to connect with the groove 104. Also formed within leg 108 is a hole 112, a similar hole 114 is formed within the leg 110. The holes 110 and 114 are in alignment with each other. When the legs 108 and 110 are connected with their respective grooves 102 and 104, a locking pin 116 is to be conducted through the holes 112 and 114 and abut against the back end of the operating head 12 thereby securely fixing in position the accessory tool 106 onto the operating head 12. The outer end of the locking pin 116 includes a threaded section 118 which is to threadably connect with a nut 120. The inner end of the locking pin 116 is connected to a graspable ring 122.

It is to be understood that there will normally be utilized a plurality of different types of tools, such as a shovel, a saw and a sindow squeegee which are to be connectable to the operating head 12 in exactly the same manner.

What is claimed is:

1. An air pressure gauge tool comprising:
a housing having a fore end and an aft end, an operating head attached to said fore end, a graspable handle section attached to said aft end;
an air pressure gauge assembly mounted within said housing, visual indicating means connected to said air pressure gauge, said visual indicating means comprises an elongated member extendable outward from said aft end and spaced from said operating head;
a valve assembly mounted within said operating head, said valve assembly connecting with a source of pressurized air, an air passage arrangement formed within said housing, said valve assembly connected to said air pressure gauge, whereby upon said valve assembly being connected to the source of pressurized air the air pressure is conducted to said valve assembly and a numerical value corresponding to the amount of air pressure is readable by said visual indicating means;
accessory tool engaging means formed within said operating head of said housing, whereby an accessory tool is to be removably connected to said accessory tool engaging means to permit said tool to be usable in a manner other than to determined air pressure; and
a locking pin connectable with said operating head, whereby said locking pin is to connect with the accessory tool to retain such in a fixed position on said operating head.

2. The air pressure gauge tool as defined in claim 1 wherein:
said valve assembly being movable within said operating head, said valve assembly being locatable in a plurality of different positions.

3. The air pressure gauge tool as defined in claim 2 including:
a detent mechanism mounted within said operating head, said detent mechanism connecting with said valve assembly, said detent mechanism for fixing said valve assembly relative to said operating head in any one of said different positions.

4. The air pressure gauge tool as defined in claim 3 wherein:
a portion of said air passage arrangement being flexible so as to bend during movement of said valve assembly between said different position.

* * * * *